United States Patent
Palanivel et al.

(10) Patent No.: US 9,215,345 B2
(45) Date of Patent: Dec. 15, 2015

(54) METHOD AND SYSTEM FOR INVERSE HALFTONING UTILIZING INVERSE PROJECTION OF PREDICTED ERRORS

(71) Applicant: Xerox Corporation, Norwalk, CT (US)

(72) Inventors: Dhevendra alagan Palanivel, Chennai (IN); Sainarayanan Gopalakrishnan, Chennai (IN); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 388 days.

(21) Appl. No.: 13/850,342

(22) Filed: Mar. 26, 2013

(65) Prior Publication Data
US 2014/0294298 A1     Oct. 2, 2014

(51) Int. Cl.
*G06K 9/00* (2006.01)
*H04N 1/40* (2006.01)
*H04N 1/405* (2006.01)

(52) U.S. Cl.
CPC ......... *H04N 1/40075* (2013.01); *H04N 1/4052* (2013.01)

(58) Field of Classification Search
USPC ........................................................ 382/167
See application file for complete search history.

(56) References Cited

U.S. PATENT DOCUMENTS

| | | | |
|---|---|---|---|
| 5,323,247 A * | 6/1994 | Parker et al. | 358/3.08 |
| 5,325,448 A * | 6/1994 | Katayama et al. | 382/270 |
| 5,506,699 A | 4/1996 | Wong | |
| 5,608,821 A | 3/1997 | Metcalfe et al. | |
| 5,696,601 A | 12/1997 | Metcalfe et al. | |
| 5,809,177 A | 9/1998 | Metcalfe et al. | |
| 5,880,857 A | 3/1999 | Shiau et al. | |
| 6,144,775 A | 11/2000 | Williams et al. | |
| 6,325,487 B1 | 12/2001 | Mantell | |
| 6,343,159 B1 | 1/2002 | Cuciurean-Zapan et al. | |
| 6,608,700 B1 | 8/2003 | Mantell | |
| 7,085,016 B2 | 8/2006 | Lu et al. | |
| 7,228,002 B2 | 6/2007 | Macy, Jr. | |
| 7,495,805 B1 | 2/2009 | Au et al. | |

(Continued)

OTHER PUBLICATIONS

Hocevar et al.,"Reinstating Floyd-Steinberg: Improved Metrics for Quality Assessment of Error Diffusion Algorithm", Lecture Notes in Computer Science; vol. 5099; Proceedings of the 3rd international conference on Image and Signal Processing (Berlin, Heidelberg, Germany), ISBN 978-3-540-69904-0, 2008.*

(Continued)

*Primary Examiner* — Yon Couso
(74) *Attorney, Agent, or Firm* — Basch & Nickerson LLP

(57) ABSTRACT

A method and system generates a reconstructed gray scale image of pixels from a binary image of pixels by reverse propagating an error, in a diffused manner, to the pixels of the binary image to create pixels representing a reconstructed gray scale image. The reverse propagation of the error determines if a current pixel has a first predetermined value; sets an error value to a first error value if the current pixel has the first predetermined value; sets the error value to a second error value if the current pixel does not have the first predetermined value; and propagates a diffused error value to a pixel neighboring the current pixel to create an error diffused pixel, the diffused error value being a product of the set error value and a weighting coefficient associated with the pixel neighboring the current pixel. A Gaussian filter may be utilized to filter the pixels representing a gray scale image to create a filtered reconstructed gray scale image of pixels.

12 Claims, 5 Drawing Sheets

(56) References Cited

U.S. PATENT DOCUMENTS

| | | |
|---|---|---|
| 7,719,722 B2 | 5/2010 | Sharma et al. |
| 7,869,095 B2 | 1/2011 | Mantell |

OTHER PUBLICATIONS

Hein, S.; Zakhor, A.; Halftone to Continuous-Tone Conversion of Error-Diffusion Coded Images; p. V309-V312; 0-7803-0946-4/93; 1993 IEEE.

Ting, M.; Riskin, E.; Error-Diffused Image Compression Using A Binary-To-Gray-Scale Decoder and Predictive Pruned Tree-Structured Vector Quantization; p. 854-858; IEEE Transactions on Image Processing, vol. 3, No. 6, Nov. 1994.

Wong, P.; Inverse Halftoning and Kernel Estimation For Error Diffusion; p. 486-498; IEEE Transactions on Image Processing, vol. 4 No. 4 Apr. 1995.

Stevenson, R.; Inverse Halftoning Via Map Estimation; pp. 574-583; IEEE Transactions on Image Processing; vol. 6 No. 4 Apr. 1997.

Xiong, Z. et al.; Inverse Halftoning Using Wavelets; pp. 569-572; 0-7803-3258-X/96; IEEE 1996.

Analoui, M.; Allebach, J.; New Results on Reconstruction of Continuous-Tone From Halftone; pp. III-313-III-316; 0-7803-0532-9/92; IEEE 1992.

Thao, Nguyen; Set Theoretic Inverse Halftoning; pp. 783-786; 0-8186-8183-7/97; IEEE 1997.

Kolmogorov, V.; Zabih, R.; What Energy Functions Can Be Minimized Via Graph Cuts?; p. 147-159; IEEE Transactions on Pattern Analysis and Machine Intelligence; vol. 26 No. 2; Feb. 2004.

Yedidia, J. et al.; Constructing Free-Energy Approximations and Generalized Belief Propagation Algorithms; p. 2282-2312; IEEE Transactions on Informaton Theory, vol. 51 No. 7, Jul. 2005.

\* cited by examiner

METHOD AND SYSTEM FOR INVERSE HALFTONING UTILIZING INVERSE PROJECTION OF PREDICTED ERRORS

BACKGROUND AND SUMMARY

In a conventional digital multifunction reprographic system, a scanner accepts a document to be copied, scanned, or otherwise subsequently processed and converts the document into an electronic image or images. These images, usually in the form of pages, are then passed to a central control unit which may re-order or reorganize these pages and then, depending on the request of the user of the device, send the pages or images to a destination. Often this destination is an attached printing unit which makes one or more copies of the original document.

The conventional multifunction digital device includes an image path. This is the combination of software and hardware elements. The software and hardware elements accept the electronic images from a multiplicity of sources and perform a plurality of operations needed to convert the images to the format desired for the various output paths.

The image path for a conventional multifunction device usually has several constraints. On one hand, there is a desire to make the image path utilize data in a multi-bit per pixel format so as to provide for maximum image quality and a minimum loss of critical information in the transformation of documents from paper to electronic form. On the other hand, cost constraints and performance limits on the devices or software may comprise the image path.

A conventional image path may also utilize a binary image path. In this situation, if the input information is scanned or otherwise obtained in a binary manner at sufficiently high resolution, and if the need arises for further image processing that can be performed only on multi-bit per pixel then the scanned image can be reconstructed with little or no perceptible loss of image quality.

Another conventional image path uses analog data in the image path. In this conventional image path, the data from the scanner is digitized, processed in contone, and then converted to binary.

All of the intermediate elements of the image path are designed to work with multi-bit per pixel data which is converted as a last step to binary or with the compact binary data format. Only at the final output is the binary data converted to a multi-bit (gray scale) format.

It is further noted that in such conventional systems, which convert gray scale image data to binary image data (so as to be processed by the binary data image path) and back to gray scale image data for rendering, a halftone process is conventionally utilized which includes the utilization of error diffusion to convert gray scale image data to binary image data.

In this process, a pixel of gray scale image data is compared to a threshold values or threshold values and depending upon the relationship of the value of the pixel of gray scale image data, a binary data value is generated.

For example, if the possible pixel value of the gray scale image data has a value between 0 and 255, the threshold value may be 128 such that a pixel value of the gray scale image data that is equal to or greater than 128 would generate a binary value of 1 (representing a gray scale value of 255) and a pixel value of the gray scale image data that is equal less than 128 would generate a binary value of 0 (representing a gray scale value of 0). In each instance, there would be a difference between the original a pixel value of the gray scale image data and the converted value. This difference is the error of the conversion process.

In a conventional conversion process that utilizes error diffusion, the error is diffused (scattered or propagated) to neighboring pixels of the gray scale image data. More specifically, the error may be conventionally propagated to the next pixel in the scanline and to adjacent pixels in the next scanline.

Moreover, in conventional error diffusion processes, the error is weighted such that an adjacent pixel does not necessarily receive all the error, only a portion thereof.

Examples of conventional error diffusion processes and various weighting methods are disclosed in U.S. Pat. No. 5,608,821; U.S. Pat. No. 5,696,601; U.S. Pat. No. 5,809,177; U.S. Pat. No. 5,880,857; U.S. Pat. No. 6,144,775; U.S. Pat. No. 6,325,487; U.S. Pat. No. 6,608,700; U.S. Pat. No. 7,719,722; and U.S. Pat. No. 7,869,095.

The entire contents of U.S. Pat. No. 5,608,821; U.S. Pat. No. 5,696,601; U.S. Pat. No. 5,809,177; U.S. Pat. No. 5,880,857; U.S. Pat. No. 6,144,775; U.S. Pat. No. 6,325,487; U.S. Pat. No. 6,608,700; U.S. Pat. No. 7,719,722; and U.S. Pat. No. 7,869,095 are hereby incorporated by reference.

With respect to converting the binary image data to gray scale image data, low pass filtering and look-up table based approaches are conventional implementations of reconstructing gray scale image data (gray scale image data) from halftone image data (binary image data). Examples of different conventional lowpass filters are halfband lowpass, Gaussian lowpass, and lowpass filtering based on singular value decomposition.

However, if the halftone image data (binary image data) is initially generated from gray scale image data (gray scale image data) using an error diffusion process, the error diffusion can inject noise into the gray scale image primarily in the high frequency range. In other words, since an error diffusion process injects high frequency noise, a low pass filter cannot necessarily remove all of the noise purposefully introduced by the error diffusion process.

However, if a high pass filter is utilized to address the noise injected by the error diffusion [process, there may have been high frequency components in the original gray scale image, such that removal of noise by a high pass filter would also remove these desirable high frequency components of the original image data, particularly a text region may lose sharpness due to the removal of the desirable high frequency components of the original image data.

In the above-mentioned conventional look-up table based approaches for reconstruction of gray image from error diffused binary, a small window is slid over the error diffused image data. The content of the binary pixels in the window serves as an address to a look-up table. A gray level value is then retrieved as the constructed gray level of the center pixel in the window.

The conventional look-up table is constructed by a training algorithm using a collection of test images. The training of the conventional look-up table is time consuming.

Moreover, since conventional error diffusion produces a binary image in which the local average within any small area of the image approximates the gray level of the corresponding small area of the original gray scale image, very different bit patterns corresponding to the same local gray level can be obtained by simply shifting a halftoning window a small amount in any direction. The different bit patterns will result in different addressing to the look-up table during inverse halftoning. Also, very different binary images from the same gray scale image can be generated by merely changing the initial condition in the error diffusion process.

Therefore, it is desirable to provide a system and method for converting binary image data to gray scale image data that removes noise injected during an error diffusion process.

Moreover, it is desirable to provide a system and method for converting binary image data to gray scale image data that does rely upon a time consuming training algorithm.

In addition, it is desirable to provide a system and method for converting binary image data to gray scale image data that does not generate different bit patterns corresponding to the same local gray level by simply shifting a halftoning window a small amount in any direction.

It is also desirable to provide a system and method for converting binary image data to gray scale image data that does not generate different binary images from the same gray scale image by merely changing the initial condition in the error diffusion process.

BRIEF DESCRIPTION OF THE DRAWING

The drawings are only for purposes of illustrating various embodiments and are not to be construed as limiting, wherein.

DETAILED DESCRIPTION

Figure 1:
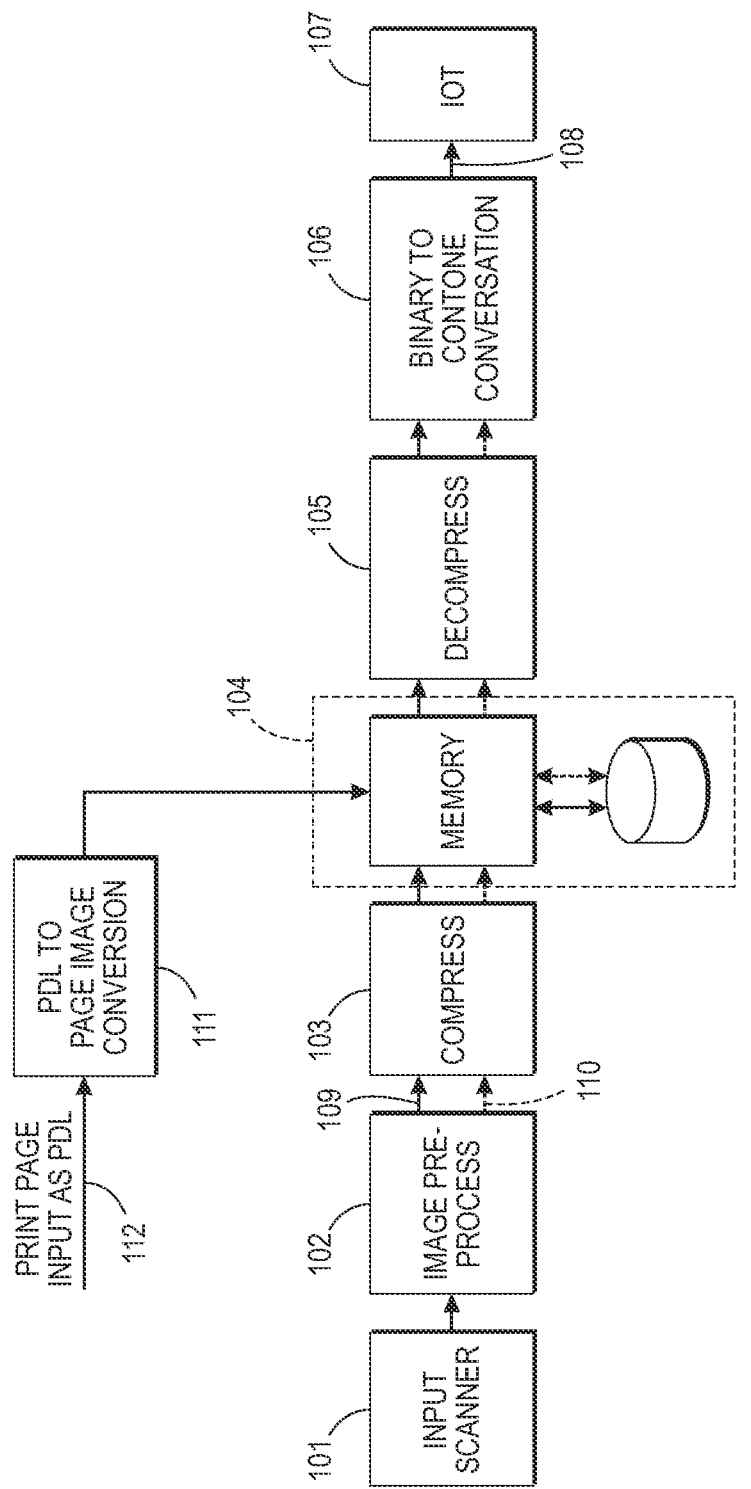
FIG. 1 shows the image path for a conventional multifunction reprographic system.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 shows, in schematic form the general, image path of a conventional multifunction reprographic system. The image path is a combination of hardware and software elements that generate, process, and store the digital page images. A control system (not shown) configures each element of the image path depending on the user job. The control system also schedules the various jobs and functions of the entire system.

As illustrated in FIG. 1, digital scanner 101 accepts a hardcopy version of the page or pages to be copied and converts each page to a digital image, in gray scale form, at some moderately high resolution. Within the scanner 101, there are usually electronic elements that do some initial processing of the image, correcting, if needed, for any optical or illumination defects in the scanner 101.

The digital page image is then passed to a preprocessor 102 that performs further manipulations of the page image, such as editing, or tone curve correction. The preprocessor 102 converts the gray scale image from the scanner 101 to a binary image 109. The preprocessor 102 also can form a tag image 110. This tag image 110 can identify, at a pixel level, various characteristics of the underlying page image. For example, the tag image can indicate whether a pixel in the page image is part of a sharp edge or not. Further details of the tag image will be described below.

After the preprocessing, the page and tag images are passed through a compression circuit 103 which losslessly compresses the page and tag images to a smaller size. The compressed images are then passed to a memory 104. The memory 104 stores each page image and its associated tag image, and keeps track of all the relevant sets of images that comprise the document being copied. The memory 104 can be used for many purposes, including for example, the ability to print multiple copies of an input document with a single scan. There are many other functions of the memory 104 that are well known to those skilled in the art.

At the time of marking, the compressed page and tag image in memory are first decompressed using the decompressor circuit 105 and the resultant image and tag are passed to the binary to gray scale converter 106. The binary to gray scale converter 106 is conventionally implemented as a two-dimensional digital filter.

The filter may be altered by incorporating one or more adaptive elements that are used to enhance edges that are characteristic of text and line art copy. With suitable tagging apparatus upstream, the filter may be switched between one of several modes to adapt to the content of the portion of the image being converted.

Figure 2:
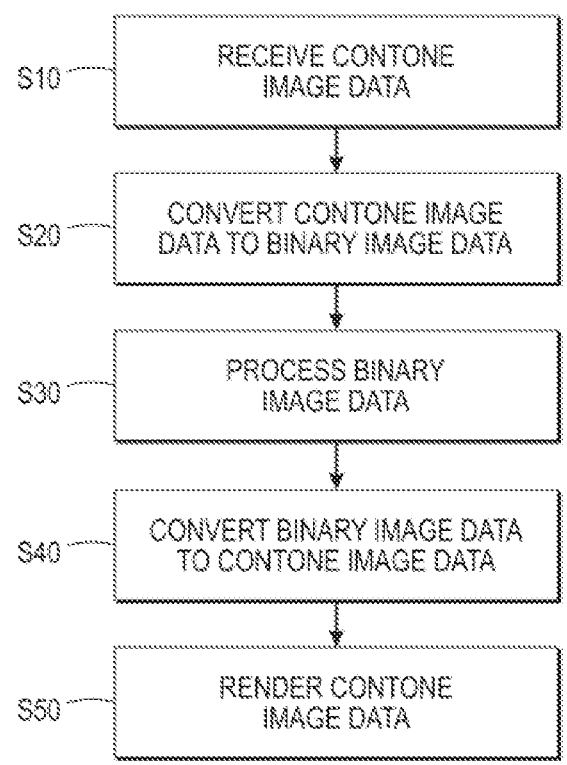
FIG. 2 shows a flowchart of the image processing utilized in a conventional multifunction reprographic system.

FIG. 2 shows a flowchart of the image processing utilized in a conventional multifunction reprographic system. As illustrated in FIG. 2, initially, gray scale image data is received, at step S10.

At step S20, the gray scale image data is converted to binary image data. Thereafter, the binary image data may be processed by various image processing routines, at step S30.

At step S40, the processed binary image data is converted to gray scale image data. Thereafter, the converted (reconstructed) gray scale image data may be rendered by a printing device, at step S50.

Figure 3:
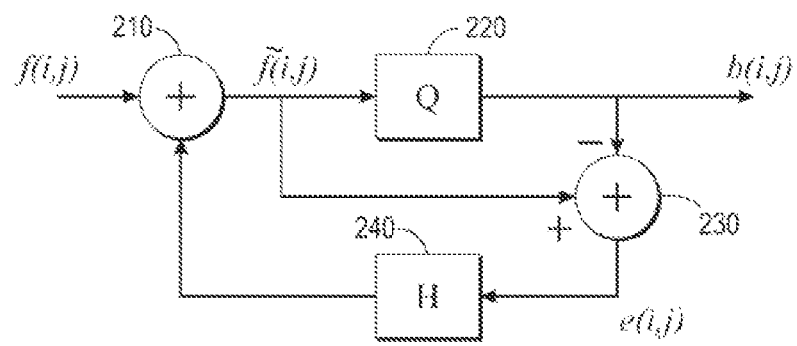
FIG. 3 shows a block diagram of a conventional error diffusion process.

FIG. 3 illustrates a conventional error diffusion process. More specifically, a gray scale image $F=f(i,j)$ is an N×M two dimensional matrix of pixels taking real intensities number in the range $[0, 1]$ ($1 \leq i \leq N$, $1 \leq j \leq M$). A binary image $B=b(i,j)$ is a two dimensional matrix of pixels taking a binary value 0 (black) or 1 (white).

It is noted that the binary value may be 1 (black) or 0 (white). The actual binary value representation depends upon whether the printing device is a write black printing device or a write white printing device.

Error diffusion is designed to preserve the average intensity level between input and output images by propagating the quantization error to unprocessed neighboring pixels according to some fixed ratios (weighting coefficients). In error diffusion, the pixel values $b(i,j)$ of binary image is determined in raster scan order. The value of $b(i,j)$ may be determined by simply thresholding as follows:

$$b(ij) = \begin{cases} 0 & \text{if } f(i,j) \leq 1/2 \\ 1 & \text{if } f(i,j) > 1/2 \end{cases} \quad (1)$$

[1] The quantization error $e(i,j)$, is computed by:

$$e(i,j)=f(i,j)-b(i,j). \quad (2)$$

[2] The error diffusion process selects the pixel values of binary image which minimize the absolute value of error

|e(i,j)|, and then distributes the weighted error to a set of unprocessed pixels, as shown below.

$$f(i+k,j+l) \leftarrow f(i+k,j+l) + h(k,l) \cdot e(i,j) \qquad (3)$$

As illustrated in FIG. 3, a gray scale image data value $\hat{f}(i,j)$ is converted (quantized) to a binary image data value $b(i,j)$ by a quantization circuit 220. The binary image data value $b(i,j)$ and the gray scale image data value $\hat{f}(i,j)$ are received by an error generation circuit 230 to generate the quantization error $e(i,j)$. The error generation circuit (Q) 230 may be an adder which determine the absolute difference between the binary image data value $b(i,j)$ and the gray scale image data value $\hat{f}(i,j)$ The quantization error $e(i,j)$ is received by a diffusion circuit (H) 240 which diffuses the quantization error $e(i,j)$ to adjacent pixels based upon a set of predetermined weighting coefficients.

As illustrated the initial gray scale image data value $f(i,j)$ is modified based upon adding a quantization error value received from the diffusion circuit (H) 240 to the initial gray scale image data value $f(i,j)$ at adder 210 to generate $\hat{f}(i,j)$.

In an inverse error diffusion process, for a given binary image $b(i,j)$ and an error diffusion kernel $h(i,j)$ (weighting coefficients), a gray scale image $\hat{f}(i,j)$ is determined so that when $\hat{f}(i,j)$ is error diffused, $\tilde{b}(i,j)$ is obtained. The mathematical relationship governing $\hat{f}(i,j)$, $h(i,j)$, and $b(i,j)$ are given above in equations (1)-(3) where $f(i,j)$ in equation (1) is replaced by $\hat{f}(i,j)$. Due to the quantization process in equation (3), the problem of determining $\hat{f}(i,j)$, for a given $b(i,j)$ and $h(i,j)$, does not have a unique solution.

Figure 4:
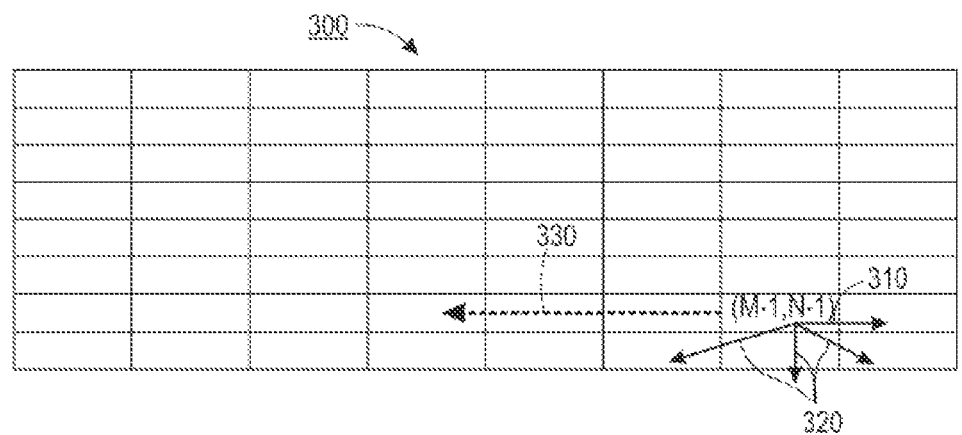
FIG. 4 shows a graphical representation of an inverse error diffusion process.
Figure 6:
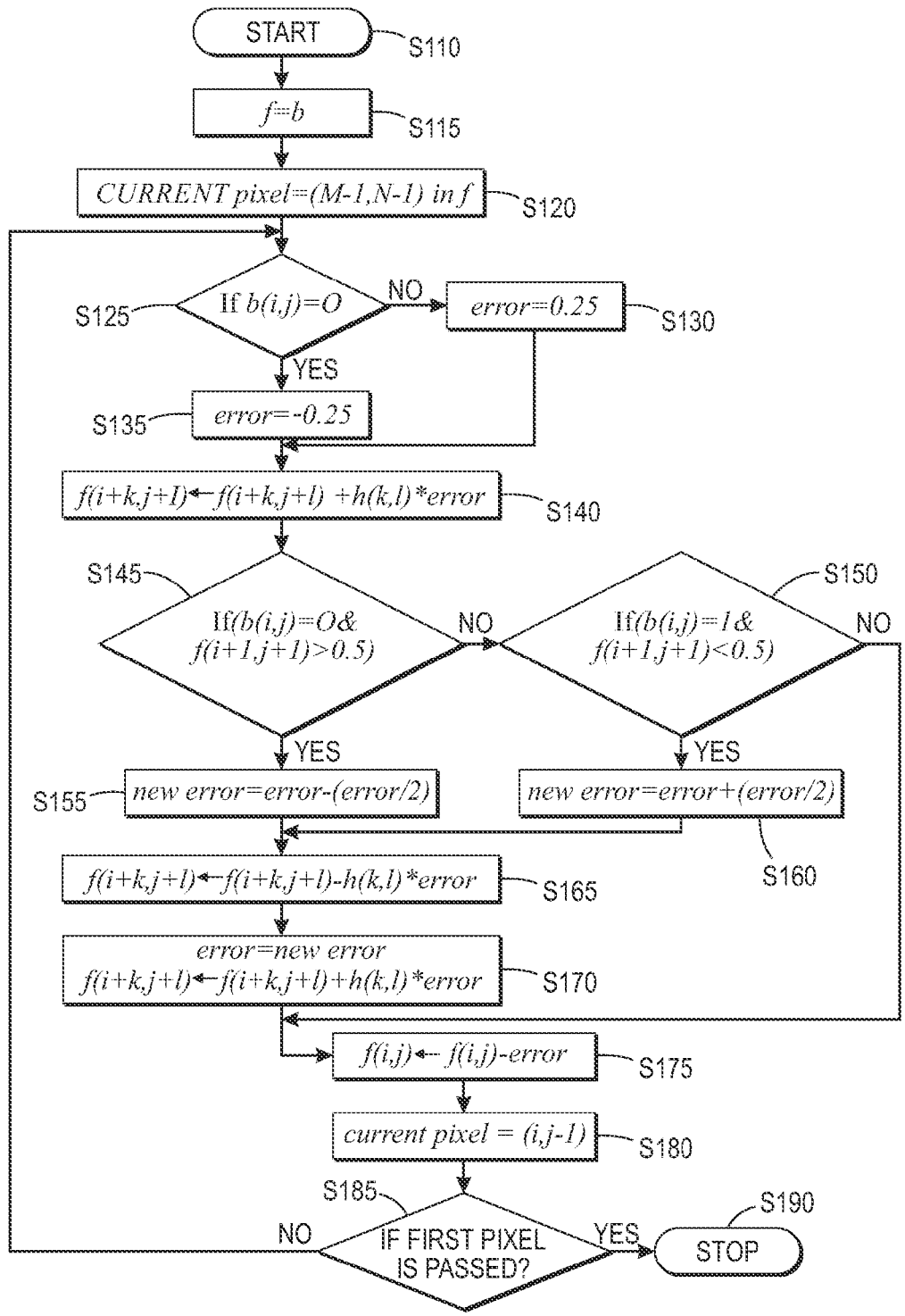
FIG. 6 shows a flowchart of an example of a binary image data to gray scale image data conversion process using an inverse projection with inverse error diffusion.

To address this issue, a reversal of the error diffusion mechanism is utilized, as illustrated in FIG. 4. As illustrated in FIG. 4, a gray scale image is obtained from an error diffused binary image generated by reverse propagation of predicted errors weighted using an error diffusion filter kernel. An example of the reverse error diffusion process will be described in more detail below utilizing FIG. 4, wherein the example utilizes a Floyd-Steinberg error diffusion kernel (set of weighting coefficients). However, it is noted that any error diffusion kernel (set of weighting coefficients) can be utilized In this example, as illustrated in FIG. 6, the reverse error diffusion process sets $\hat{f}=b$, at step S115. Thereafter, at step S120, the current pixel $(i,j)$ is set to the $(M-1, N-1)^{th}$ pixel of the M×N image, as illustrated in FIGS. 4 and 6. At step S125, it is determined if $b(i,j)=0$. If it is determined that $b(i,j)=0$ at step S125, the process sets, at step S135, the error to $-0.25$, else, at step S130, the process sets error to $0.25$.

A weighted error, using an error filter coefficient, is added (310 of FIG. 4) to the $(M-1, N)^{th}$ pixel of the M×N image, at step S140. Moreover, at step S140, weighted errors, using an error filter coefficients, are added (320 of FIG. 4) to the $(M,N)^{th}$ pixel of the M×N image, the $(M,N-1)^{th}$ pixel of the M×N image, and the $(M,N-2)^{th}$ pixel of the M×N image. It is noted that the diffusion may include additional pixels depending upon the error diffusion kernel utilized. The following equation represents the reverse error diffusion process for the neighboring pixel: $\hat{f}(i+k,j+l) \leftarrow \hat{f}(i+k,j+l) + h(k,l) \ast \text{error}$.

In the reverse error diffusion process, at step S145, it is determined if $b(i+1, j+1)=0$ and $\hat{f}(i+1, j+1)>0.5$. If it is determined that $b(i+1, j+1)=0$ and $\hat{f}(i+1, j+1)>0.5$, the error is decreased, at step S155, new error=error−(error/2).

At step S150, it is determined if $b(i+1, j+1)=1$ and $\hat{f}(i+1, j+1)<0.5$. If it is determined that $b(i+1, j+1)=1$ and $\hat{f}(i+1, j+1)<0.5$, the error is increased, at step S160, new error=error+(error/2), else the process goes to step S175.

If the error is changed (decreased or increased), the neighborhood pixels values, at step S165, are changed to old values, $\hat{f}(i+k,j+1) \leftarrow \hat{f}(i+k,j+1) - h(k,l) \ast \text{error}$.

Thereafter, at step S170, the error is set to the new error, and the new error value is used to obtain neighborhood pixels values, $\hat{f}(i+k,j+1) \leftarrow \hat{f}(i+k,j+1) + h(k,l) \ast \text{error}$.

The error value is subtracted, at step S175, from current pixel, $\hat{f}(i,j) = \hat{f}(i,j) - \text{error}$. At step S180, the process now moves (330 of FIG. 4) to the next pixel in reverse order. For example, if the current pixel is the $(M-1, N-1)^{th}$ pixel of M×N image, the process moves to the $(M-1, N-2)^{th}$ pixel of M×N image.

When the process moves to the first pixel of the scanline $((1, N-1)^{th}$ pixel of M×N image), the process moves to the $(M-2, N-1)^{th}$ pixel of M×N image.

After moving to the next pixel, the reverse error diffusion process is repeated until the first pixel (step S185) is processed.

Figure 5:
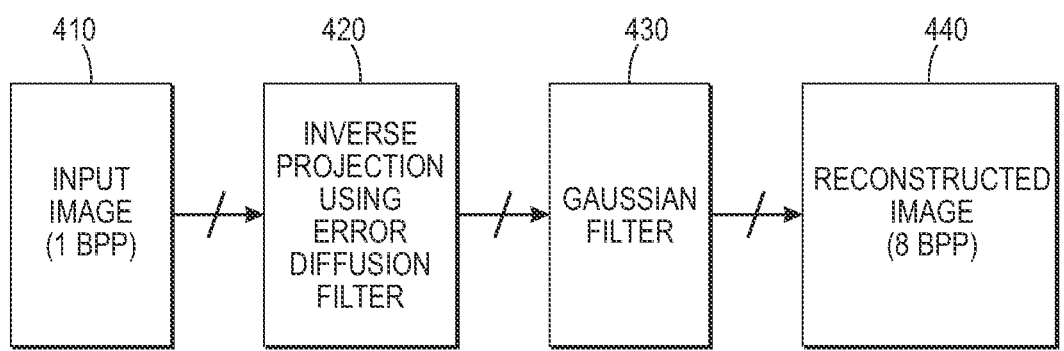
FIG. 5 shows a block diagram of an example of a binary image data to gray scale image data conversion process using an inverse projection with inverse error diffusion.

A block diagram of this overall process is illustrated in FIG. 5. As illustrated in FIG. 5, the inverse projecting with error diffusion filter 420 receives a binary image 410. The inverse projecting with error diffusion filter 420 converts the binary image into a gray scale image utilizing the above-described reverse error diffusion process.

The converted gray scale image may pass through a Gaussian filter 430 to create a reconstructed gray scale image 440.

It is noted that other filters, such as sigma filters, may be used instead of the Gaussian filter. Examples of filters which can process the converted gray scale image data are: (1) 3×3 sigma 0.5 filter; (2) 3×3 sigma 1.0 filter; (3) 3×3 sigma 2.0 filter; (4) 3×3 Gaussian sigma 0.5 filter; (5) 3×3 Gaussian sigma 1.0 filter; (6) 3×3 Gaussian sigma 2.0 filter; or (7) 5×5 Gaussian sigma 0.5 filter. Each of these filters will generate a different a Peak Signal to Noise Ratio (PSNR) for the reconstructed image.

The Peak Signal to Noise Ratio (PSNR) for a given original image X of size M×N and its reconstructed image $X^{est}$ is defined as follows:

$$PSNR = 10 \log_{10} \frac{255^2}{\left(\frac{1}{NM}\right) \sum_{i=0}^{N-1} \sum_{j=0}^{M-1} (X_{ij} - X_{ij}^{est})^2}$$

It is noted that images may become more blurred with increasing sigma. Inverse projection with filtering produces high Peak Signal to Noise Ratio images for lesser sigma values compared to a process using only a Gaussian low pass filter. Thus, inverse projection with filtering provides better edge quality images with a higher Peak Signal to Noise Ratio without requiring edge detection from a segmentation process.

A system that generates a reconstructed gray scale image of pixels from a binary image of pixels includes an inverse projection error diffusion circuit to reverse propagate error, in a diffused manner, to the pixels of the binary image to create pixels representing a reconstructed gray scale image. The system further includes a Gaussian filter to filter the pixels representing a gray scale image to create a filtered reconstructed gray scale image of pixels.

The inverse projection error diffusion circuit determines if a current pixel has a first predetermined value; sets an error value to a first error value if the current pixel has the first predetermined value; sets the error value to a second error value if the current pixel does not have the first predetermined value; and propagated a diffused error value to a pixel neighboring the current pixel to create an error diffused pixel, the diffused error value being a product of the set error value and a weighting coefficient associated with the pixel neighboring the current pixel.

The inverse projection error diffusion circuit determines if the current pixel has a second predetermined value; determines if the error diffused pixel is greater than a third predetermined value; determines if the error diffused pixel is less than the third predetermined value; decreases the error value, if the current pixel has the first predetermined value and the error diffused pixel is greater than the third predetermined value, to create a new error value; increases the error value, if the current pixel has the second predetermined value and the error diffused pixel is less than the third predetermined value, to create the new error value; removes the diffused error value from the pixel neighboring the current pixel to bring the value back to a previous value; and, after removing the diffused error value, propagating a second diffused error value, based on the new error value to a pixel neighboring the current pixel to create the error diffused pixel.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system to generate a reconstructed gray scale image of pixels from a binary image of pixels, comprising:
    an inverse projection error diffusion circuit to reverse propagate error to the pixels of the binary image to create pixels representing a reconstructed gray scale image;
    said inverse projection error diffusion circuit determining if a current pixel has a first predetermined value;
    said inverse projection error diffusion circuit setting an error value to a first error value if the current pixel has the first predetermined value;
    said inverse projection error diffusion circuit setting the error value to a second error value if the current pixel does not have the first predetermined value;
    said inverse projection error diffusion circuit propagating a diffused error value to a pixel neighboring the current pixel to create an error diffused pixel, the diffused error value being a product of the set error value and a weighting coefficient associated with the pixel neighboring the current pixel;
    said inverse projection error diffusion circuit determining if the current pixel has a second predetermined value;
    said inverse projection error diffusion circuit determining if the error diffused pixel is greater than a third predetermined value;
    said inverse projection error diffusion circuit determining if the error diffused pixel is less than the third predetermined value;
    said inverse projection error diffusion circuit decreasing the error value, if the current pixel has the first predetermined value and the error diffused pixel is greater than the third predetermined value, to create a new error value;
    said inverse projection error diffusion circuit increasing the error value, if the current pixel has the second predetermined value and the error diffused pixel is less than the third predetermined value, to create the new error value;
    said inverse projection error diffusion circuit removing the diffused error value from the pixel neighboring the current pixel to bring the value back to a previous value;
    said inverse projection error diffusion circuit, after removing the diffused error value, propagating a second diffused error value, based on the new error value to a pixel neighboring the current pixel to create the error diffused pixel.

2. The system as claimed in claim 1, further comprising:
    a Gaussian filter to filter the pixels representing a gray scale image to create a filtered reconstructed gray scale image of pixels.

3. The system as claimed as claimed in claim 1, wherein the first predetermined value is 0, the first error value is −0.25, and the second error value is 0.25.

4. The system as claimed as claimed in claim 2, wherein the first predetermined value is 0, the first error value is −0.25, and the second error value is 0.25.

5. The system as claimed as claimed in claim 1, wherein the first predetermined value is 0, the second predetermined value is 1, the third predetermined value is 0.5, the first error value is −0.25, the second error value is 0.25, the error value is decreased by half of the error value or increased by half of the error value.

6. The system as claimed as claimed in claim 2, wherein the first predetermined value is 0, the second predetermined value is 1, the third predetermined value is 0.5, the first error value is −0.25, the second error value is 0.25, the error value is decreased by half of the error value or increased by half of the error value.

7. A method to generate a reconstructed gray scale image of pixels from a binary image of pixels, comprising:
    (a) reverse propagating error to the pixels of the binary image to create pixels representing a reconstructed gray scale image;
    said reverse propagating error including,
        (a1) determining if a current pixel has a first predetermined value;
        (a2) setting an error value to a first error value if the current pixel has the first predetermined value;
        (a3) setting the error value to a second error value if the current pixel does not have the first predetermined value;
        (a4) propagating a diffused error value to a pixel neighboring the current pixel to create an error diffused pixel, the diffused error value being a product of the set error value and a weighting coefficient associated with the pixel neighboring the current pixel,
        (a5) determining if the current pixel has a second predetermined value;
        (a6) determining if the error diffused pixel is greater than a third predetermined value;
        (a7) determining if the error diffused pixel is less than the third predetermined value:
        (a8) decreasing the error value, if the current pixel has the first predetermined value and the error diffused pixel is greater than the third predetermined value, to create a new error value;
        (a9) increasing the error value, if the current pixel has the second predetermined value and the error diffused pixel is less than the third predetermined value, to create the new error value;
        (a10) removing the diffused error value from the pixel neighboring the current pixel to bring the value back to a previous value; and
        (a11) propagating, after removing the diffused error value, a second diffused error value, based on the new error value to a pixel neighboring the current pixel to create the error diffused pixel.

8. The method as claimed in claim 7, further comprising:
   (b) Gaussian filtering the pixels representing a gray scale image to create a filtered reconstructed gray scale image of pixels.

9. The method as claimed as claimed in claim 7, wherein the first predetermined value is 0, the first error value is −0.25, and the second error value is 0.25.

10. The method as claimed as claimed in claim 8, wherein the first predetermined value is 0, the first error value is −0.25, and the second error value is 0.25.

11. The method as claimed as claimed in claim 7, wherein the first predetermined value is 0, the second predetermined value is 1, the third predetermined value is 0.5, the first error value is −0.25, the second error value is 0.25, the error value is decreased by half of the error value or increased by half of the error value.

12. The method as claimed as claimed in claim 8, wherein said first predetermined value is 0, the second predetermined value is 1, the third predetermined value is 0.5, the first error value is −0.25, the second error value is 0.25, the error value is decreased by half of the error value or increased by half of the error value.

\* \* \* \* \*